Patented July 1, 1947

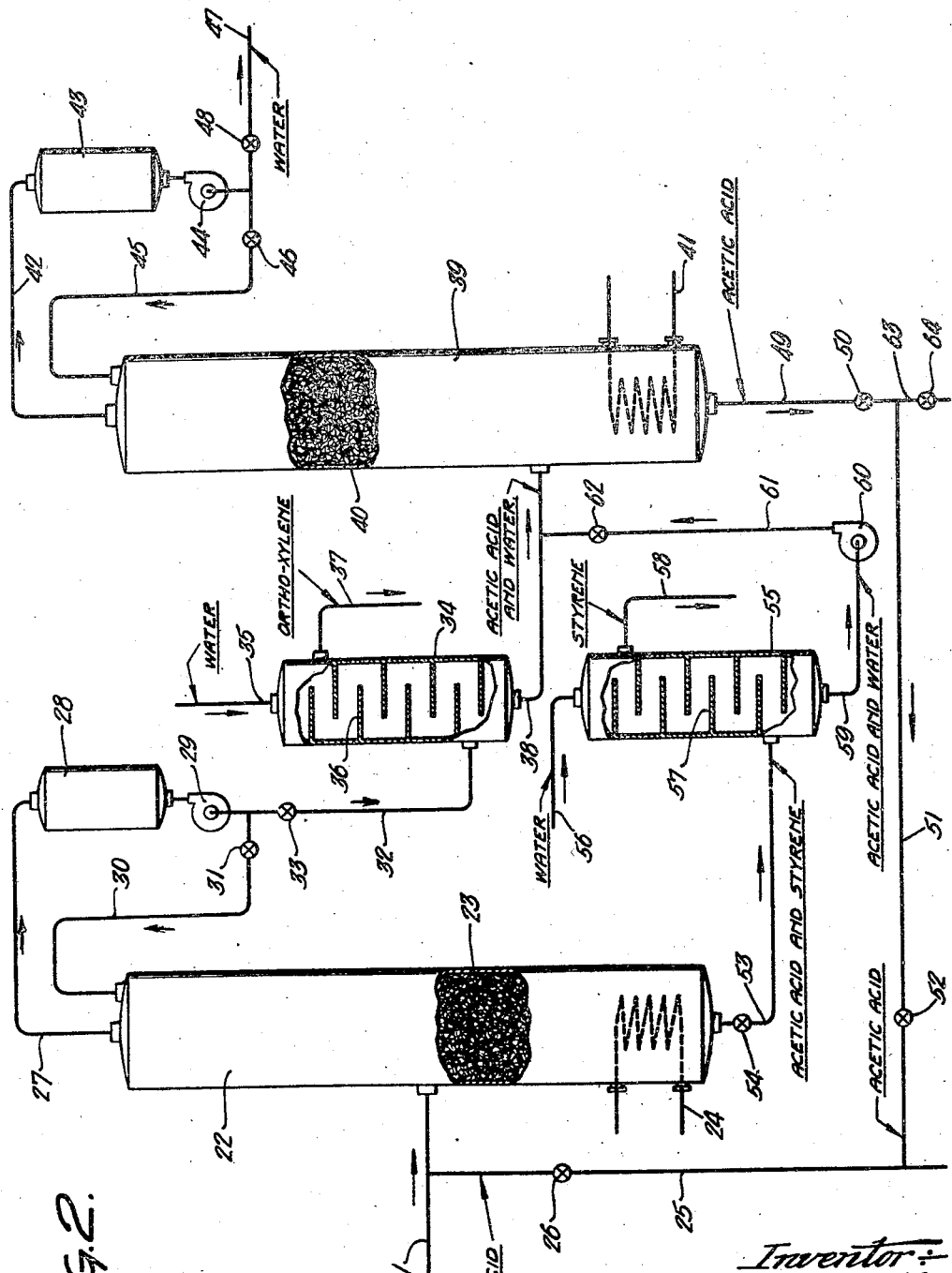

2,423,412

UNITED STATES PATENT OFFICE 2,423,412

AZEOTROPIC DISTILLATION OF OTHER AROMATIC HYDROCARBONS FROM STYRENE WITH ACETIC ACID

Edward H. Smoker, Drexel Hill, Pa., assignor to The United Gas Improvement Company, a corporation of Pennsylvania Application June 2, 1943, Serial No. 489,342

20 Claims. (Cl. 202—42)

1

This invention pertains generally to the separation of styrene from mixtures containing styrene and material difficultly separable therefrom by ordinary distillation conditions, and particularly to the separation of styrene-xylene mixtures such as those obtainable from light oil produced in the manufacture of combustible gas such as oil gas, carburetted water gas, coal gas, coke oven gas, etc.

A typical light oil styrene fraction separated from light oil by more or less conventional but efficient distillation procedure will contain hardly more than say 50% to 60% styrene.

Somewhat higher concentrations are obtainable only with increasing losses of styrene by polymerization even though distillation takes place in the presence of a polymerization inhibitor and at very substantially reduced pressures.

A light oil styrene fraction contains at least four major components namely, styrene, ortho-xylene, meta-xylene, and para-xylene, as well as a number of other components some of which have been identified such as phenyl acetylene, ethyl benzene, and frequently organic sulfur compounds.

Styrene boils at approximately 145° C.; ortho-xylene at approximately 144° C.; meta-xylene at approximately 139° C.; para-xylene at approximately 137° C.; ethyl benzene at approximately 136° C.; and phenyl acetylene at approximately 142° C.

In view of the closeness of its boiling point to that of styrene, ortho-xylene concentrates in a styrene-xylene mixture along with the styrene, and in view of the fact that styrene is extremely heat sensitive and polymerizes to a considerable extent during the distillation, it is quite possible to concentrate ortho-xylene with respect to the styrene during the concentration of the latter with respect to the other components present.

In an effort to obtain a higher concentration of styrene by distillation methods, various materials were added to styrene containing mixtures and the mixtures were subjected to distillation in the presence of the added material. In many cases, the separation of styrene was improved but little, and in the majority of cases, the separation of styrene was hindered rather than improved.

However, as a result of extensive experimentation, I have discovered that by the addition of acetic acid to mixtures of styrene and other material of similar boiling point and difficultly separable from styrene by ordinary distillation, and particularly to light oil fractions containing styrene and xylene, under substantially the same

2 distillation conditions, a considerably higher proportion of the styrene may be recovered in concentrated form.

For the purpose of convenience, my invention will be described in connection with the separation of styrene from ortho-xylene, but it is to be understood that styrene may be separated from any materials of a similar boiling point and capable of forming a minimum boiling azeotrope with acetic acid in a like manner.

In carrying out the process of my invention, acetic acid may be added to the styrene-ortho-xylene mixture to be separated and the mixture of acetic acid, styrene, and ortho-xylene, together with any other material which may be present is charged into a suitable apparatus. The mixture may then be subjected to distillation conditions and the styrene is recovered in a more concentrated form.

Although I do not intend to be limited to any particular theory of operation, apparently the addition of acetic acid to a mixture containing styrene and ortho-xylene causes the formation of two azeotropes, a styrene-acetic acid mixture and an ortho-xylene-acetic acid mixture. The difference in boiling points of these two azeotropic mixtures is greater than the approximately 1° difference between styrene and ortho-xylene, and hence the two azeotropes may be more readily separated from each other.

Both the ortho-xylene and styrene may be easily separated from the acetic acid by washing with water.

If desired, any meta-xylene and/or para-xylene which may be present in the mixture may be first separated therefrom by ordinary distillation, and then the mixture obtained, which contains ortho-xylene, may be subjected to distillation in the presence of acetic acid.

On the other hand, acetic acid may be added to a styrene mixture containing all of the xylenes, and the mixture subjected to distillation conditions to recover the concentrated styrene.

The conditions of operation of my process may be widely varied. However, particularly advantageous results are obtained when certain conditions are maintained.

In view of the tendency of styrene to polymerize upon being subjected to heat, it is desirable to conduct the distillation under conditions insufficiently drastic to cause polymerization of a large part of the styrene present. Therefore, although the distillation may be carried out at atmospheric or superatmospheric pressures if desired, advantageous results are realized when the distillation is conducted at subatmospheric pressures. Particularly advantageous results are obtained when pressures in the still pot are on the order of 100 to 200 mm. of mercury. The overhead pressures are somewhat lower.

The temperatures of distillation are naturally governed by the styrene mixture under treatment and by the pressure employed during distillation. Any temperature suitable for separation of styrene under the conditions obtaining may be used in carrying out my invention. When operating at subatmospheric pressures, lower temperatures may be employed; for example at 100 to 200 mm. of mercury, a temperature on the order of 70° C. to 100° C. is very desirable.

Particularly advantageous results are obtained when the distillation is conducted at such pressures that the desired separation of styrene will be obtained without employing temperatures in excess of 100° C.

The reflux ratio employed in carrying out my invention depends upon the concentration of styrene in the mixture under treatment, the desired concentration to be obtained at the end of the treatment, and the number of theoretical plates in the column in which the distillation is carried out. For example, in batch distillations when the concentration of styrene in the mixture under treatment is of the order of 60%, when the desired concentration to be obtained is on the order of 80%, and with a column having 16 theoretical plates, a reflux ratio of 5:1 gives very advantageous results.

The quantity of acetic acid employed in carrying out my invention is subject to wide variation, depending among other things, on the type of mixture under treatment, and the desired degree of purity to be obtained. However, when certain quantities of acetic acid are employed, unusually good separation of styrene and ortho-xylene is had. For example, in batch distillations, I have obtained advantageous results in separating styrene from xylene when the ratio of acetic acid to hydrocarbon in the mixture to be distilled is about two parts by weight of acetic acid to one part by weight of hydrocarbon. In continuous distillations, a ratio of 0.5:1 may, for example, be employed.

In the process of my invention, the ratio of acetic acid to hydrocarbon is preferably about 0.2 to 5 parts by weight of acetic acid to 1 part by weight of hydrocarbon, and still more preferably the ratio is about 0.4 to 3 parts by weight of acetic acid to 1 part by weight of hydrocarbon.

The process of my invention may be carried out employing any desired styrene containing mixture. However, I have found that very desirable results are obtained when the styrene concentration of the mixture is raised to such a point that meta-xylene, para-xylene, and ethyl benzene, if originally present, are substantially completely removed and substantially only ortho-xylene remains.

For instance, the xylene material present in a light oil styrene fraction in which the concentration of styrene is from 50 to 60% ordinarily consists chiefly of ortho-xylene together with some meta-xylene and para-xylene. Such a fraction is highly desirable for use in the process of my invention. The xylene material present in a light oil styrene fraction in which the concentration of styrene is about 70% or higher is ordinarily substantially all ortho-xylene. Such a fraction is particularly desirable for use in the process of my invention.

In one modification of my invention, a light oil styrene fraction containing from 50 to 60% styrene, the balance of which comprises essentially ortho-xylene, may be mixed with acetic acid in amount equivalent to about two parts by weight of acetic acid to one part by weight of the hydrocarbons present in the fraction. The mixture obtained may be then charged to a suitable batch fractionating system and heated at subatmospheric pressures to a temperature not exceeding 100° C.

The xylene-acetic acid azeotrope comes off overhead first. The distillation may be continued so as to take overhead the styrene-acetic acid azeotrope or the distillation be stopped, and the residual styrene-acetic acid azeotrope withdrawn from the still pot. The styrene, as well as the ortho-xylene, may be separated from the acetic acid by washing with water in any suitable apparatus.

The following specific examples will serve to illustrate my invention:

Example 1

400 grams of a solution containing 55% styrene and 45% ortho-xylene was distilled at 100 mm. of mercury through a still of 16 theoretical plates with a reflux ratio of 5:1. The temperature of the distillation was not allowed to exceed 85° C. Cuts were taken periodically, were weighed, and styrene in the hydrocarbon residue was determined by refractivity intercept. At the end of the distillation 36% of the styrene was recovered as styrene in 80% concentration.

The above distillation was made in order to have a direct basis for gauging the value of acetic acid in separating styrene from styrene-xylene mixtures.

Example 2

A mixture of 800 grams of acetic acid and 200 grams of 55% styrene solution, the remainder of said solution consisting essentially of ortho-xylene, was distilled at 100 mm. of mercury in a still having 16 theoretical plates and with a reflux ratio of 5:1. The temperature of the distillation was not allowed to exceed 85° C. Cuts were taken periodically, were weighed, were washed free of acetic acid, were reweighed, and styrene in the hydrocarbon residue was determined by refractivity intercept. At the end of distillation, 82% of the styrene was recovered as styrene of 80% concentration.

The above examples clearly bring out the advantages of my invention in which styrene-ortho-xylene mixtures are distilled in the presence of acetic acid.

These advantages are further illustrated by reference to Figure 1 of the drawings in which:

Figure 2 illustrates diagrammatically, and partly in section, a system for carrying out the process.

Figure 1:
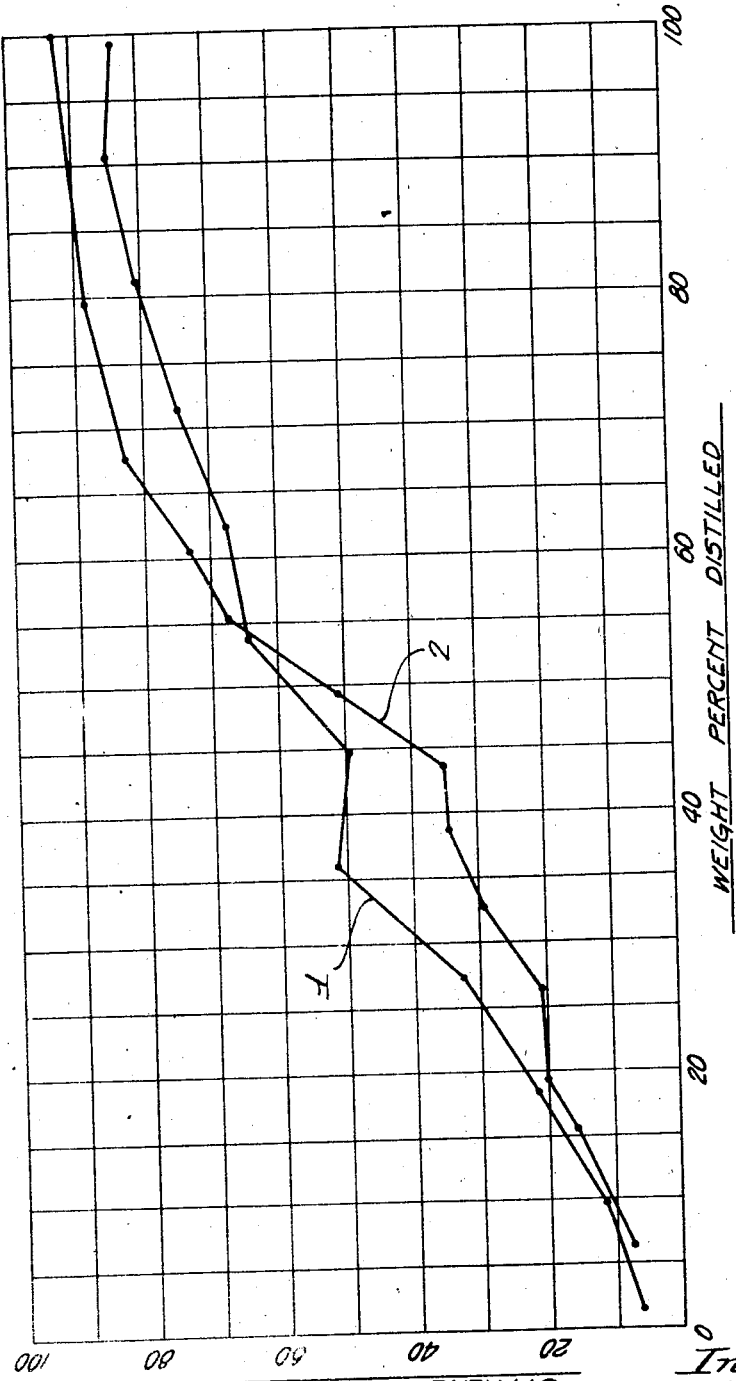
Figure 1 shows curves illustrating the invention.

In Figure 1 weight percent of styrene is plotted along the Y axis and weight percent distilled is plotted along the X axis.

Curve 1 exemplifies a typical distillation without the addition of acetic acid of a light oil styrene fraction containing initially 60% styrene, and curve 2 exemplifies the distillation of the same fraction under the same conditions after the addition of acetic acid thereto.

It will be noted that in these particular distillations, curve 1 crosses curve 2 when slightly more than half of the charge has been taken off overhead and at a styrene concentration of approximately 65%.

Up to this point the styrene concentration in the forerunnings or, in other words, in the material taken off overhead is considerably greater in the case of curve 1 than in the case of curve 2, thus showing a considerably lesser efficiency of separation.

Extending to the right of the point of intersection of curves 1 and 2, curve 2 rises considerably higher than curve 1, demonstrating the increased efficiency of separation obtainable by the addition of acetic acid.

The distillations represented by curves 1 and 2 were carried out in a column have 16 theoretically perfect plates under a reflux ratio of 5:1, and a pressure of 100 mm.

The charge in one case was 200 grams and in the other case 500 grams of the same light oil styrene fraction having a styrene concentration of 55%.

800 grams of acetic acid were added to the 200 grams charge which was then distilled to furnish the data for curve 2.

It will be noted that the maximum concentration obtained in a single distillation with acetic acid was 90.7% as against 84.9% without acetic acid.

Calculating the recovery of styrene conventionally in terms of styrene in 80% concentration, 82% of the styrene in the original charge was recoverable in a concentration of 80% styrene when acetic acid was used and only 36% was so recovered when acetic acid was not used.

The results of the following examples still further illustrate the improved separation of ortho-xylene from styrene which can be obtained by the process of my invention.

Example 3

Extremely pure samples of both styrene and ortho-xylene were prepared. The samples were mixed to obtain a mixture containing 45% of styrene and 55% of ortho xylene. This mixture was then charged to a fractionating column filled with glass helices and rated at 17 theoretical plates at total reflux. The mixture was distilled in this column at total reflux to obtain 28.9% styrene in the overhead and 47.9% styrene in the still pot.

The data obtained was substituted in the Fenske equation which is as follows:

$$n = \frac{\log \frac{x_2(1-x_1)}{x_1(1-x_2)}}{\log \alpha}$$

$n$ = number of theoretical plates in fractionating system
$\alpha$ = relative volatility of the two components
$x_1$ = mol fraction of lower boiling components at bottom of fractionating system
$x_2$ = mol fraction of lower boiling components at top of fractionating system The relative volatility, $\alpha$, of the ortho xylene-styrene mixture was found to be 1.06.

Example 4

To a mixture containing the same percentages of styrene and ortho-xylene and prepared as in Example 3 was added 2.0 volumes per volume of mixture of glacial acetic acid which had been previously purified, and the resulting mixture was subjected to distillation in the same column under the same conditions employed in Example 3. The overhead composition was 5.7% styrene and the bottoms contained 47.0% styrene.

The relative volatility, $\alpha$, of the mixture was calculated as in Example 3 and found to be 1.19.

Example 5

To a mixture containing 45% styrene and 55% ortho-xylene and prepared as in Example 3, was added 0.5 volume of glacial acetic acid per volume of mixture. The resulting mixture was subjected to distillation in the same column and under the identical conditions employed in Example 3, 4.0% styrene was obtained in the overhead and 47.0% styrene was obtained as bottoms.

The relative volatility of the mixture was calculated as in Example 3 and found to be 1.20.

From the above examples, it will seem that the addition of acetic acid to a mixture of styrene and ortho-xylene increases the relative volatility of the components of the mixture to such a degree that separation thereof may be readily accomplished.

The process of my invention may be carried out continuously or intermittently in a suitably designed fractional distillation system in which one or more fractional distillation columns may be employed to attain the desired degree of separation of styrene from xylene.

In addition, styrene of higher concentration than that specifically disclosed herein may be readily obtained by operating the process under different conditions. For example, if desired styrene of a higher degree of purity may be obtained by the use of a column or columns having a greater number of theoretical plates and by the use of a higher reflux ratio.

A suitable method for continuously operating my invention is diagrammatically illustrated in the flow sheet of Figure 2.

Referring to Figure 2, the mixture containing styrene and ortho-xylene for example a light oil fraction containing styrene and ortho-xylene is charged into the system through line 21.

The mixture enters column 22 which may be any fractionating column of suitable design and which may contain any suitable phase contacting means 23 and which contains suitable heating means, for example, a heating coil 24.

Prior to the entry of the styrene-ortho-xylene mixture into column 22, acetic acid is added through line 25 controlled by valve 26; line 25 feeding into line 21 prior to its entry into column 22.

If desired, the acetic acid may be fed directly to the column at any desired point.

In column 22 the mixture containing styrene, ortho-xylene, and acetic acid is subjected to distillation conditions and ortho-xylene in admixture with acetic acid is withdrawn overhead through line 27, and passed to condenser 28. A portion of the overhead material may be returned to column 22 by means of pump 29 through line 30 controlled by valve 31 as reflux.

The remainder of the overhead material may be then passed through line 32 controlled by valve 33 to a suitable wash tower 34 for the separation of the acetic acid from the ortho-xylene.

The ortho-xylene-acetic acid mixture is passed upwardly in tower 34 and therein contacted with a countercurrent stream of water which enters through line 35 and passes downwardly in the tower. Suitable agitation may be provided by means such as baffles 36. The ortho-xylene is withdrawn from the top of tower 34 through line 37.

From the bottom of tower 34 a solution of acetic acid and water is drawn off through line 38 and passed into column 39 which may contain suitable packing 40 and which contains heating means such as heating coil 41.

In column 39 the acetic acid solution is subjected to distillation and a material consisting chiefly of water is withdrawn overhead through line 42, passed to condenser 43 and usually a part is recirculated by means of pump 44, line 45, controlled by valve 46, a reflux to column 39 and a part passed off through line 47 controlled by valve 48 as desired.

From the bottom of column 39 concentrated acetic acid is withdrawn through line 49 controlled by a suitable valve 50, such as a liquid level control, and recycled if desired through line 51 controlled by valve 52 for addition to or substitution for the acetic acid entering the system through line 25 or passed through line 63, controlled by valve 64, to disposal.

Returning to column 22 the acetic acid-styrene mixture is withdrawn from the bottom of column 22 through line 53 controlled by a suitable valve 54 such as a liquid level control valve and is passed into tower 55 for washing with water. In tower 55 water is admitted through line 56 and passes downwardly in concurrent contact with the acetic acid-styrene mixture. Desired agitation is supplied by means such as baffles 57. Highly concentrated styrene is withdrawn from the top of tower 55 by means of line 58 and a solution of acetic acid and water is drawn from the bottom of tower 55 by means of line 59.

The solution obtained from the bottom of tower 55 is passed by means of pump 60 and line 61 controlled by valve 62 and admixed with the solution passing through line 38 and the solution obtained from the two wash towers are charged into column 39, the action of which has been previously described.

Although but one column has been shown for the separation of styrene from ortho-xylene, a plurality of columns may be employed to obtain the desired separation.

Likewise, a plurality of columns may be employed to separate the water from acetic acid.

The process of my invention as herein described is applicable to any mixture of compounds containing styrene and material of similar boiling point and difficultly separable therefrom by ordinary distillation and capable of forming a minimum boiling azeotrope with acetic acid, particularly ortho-xylene, particularly if the boiling temperatures of the additional constituents or of any azeotropic mixture between such constituents or between such constituents and acetic acid are sufficiently removed from the boiling temperatures of the styrene-acetic acid azeotrope and the ortho-xylene-acetic acid azeotrope. Even should the boiling temperatures involved be close, it will generally be found possible to vary the conditions of operation of the process to successfully overcome this difficulty.

Although it is preferred to employ substantially pure acetic acid as the entraining liquid in the process of my invention, the invention may be successfully carried out when less concentrated forms of acetic acid are used.

Any impurities which may be present are preferably not of a nature as to interfere with the separation of styrene from ortho-xylene or of a nature as to unfavorably affect the boiling points of the azeotropic mixtures formed during the process.

For instance, any impurities which may be present are preferably such as not to cause the formation of a separate liquid phase in the system under treatment.

Although a particular procedure for separating the styrene and the ortho-xylene from the azeotropic mixtures obtained has been set forth, it is to be understood that any other procedure for obtaining such a separation may be employed.

Likewise, any other means of separating acetic acid from water may be used. For example, a highly effective method for separating acetic acid from water is that comprising azeotropic distillation with benzene.

In addition, if desired, a suitable polymerization inhibitor such as catechol, pyrogallol, para-tertiary-butyl catechol, hydroquinone, and the like or mixtures of such inhibitors may be employed during the azeotropic distillation step.

Broadly summarizing, this invention relates to the concentration of styrene, and it comprises a method wherein a styrene fraction containing other similarly boiling material difficultly separable therefrom by ordinary distillation methods, such as xylene, is subject to distillation conditions in the presence of acetic acid, advantageously in amount equivalent to about 0.2 to 5 parts of acetic acid to one part hydrocarbon, whereby styrene of higher concentration is obtained; all as more fully hereinabove set forth, and as claimed.

It is to be understood that the above particular description is by way of illustration and that changes, omissions, additions, substitutions, and/or modifications might be made within the scope of the claims without departing from the spirit of the invention which is intended to be limited only as required by the prior art.

I claim:

1. A process for the separation of styrene from a mixture containing styrene and other aromatic hydrocarbon material containing 8 carbon atoms per molecule comprising subjecting the mixture to distillation conditions in the presence of acetic acid.

2. A process for the concentration of styrene in a light oil styrene fraction containing other hydrocarbons including ortho-xylene which comprises subjecting the fraction to distillation conditions in the presence of acetic acid.

3. A process for the concentration of styrene in admixture with other material including ortho-xylene which comprises adding acetic acid to said mixture and subjecting the resulting mixture to distillation conditions.

4. A process for the concentration of styrene in admixture with other material including ortho-xylene which comprises admixing with said mixture acetic acid in the ratio of about 0.2 to 5 parts of acetic acid per part of styrene mixture and subjecting the resulting mixture to distillation conditions.

5. A process for the concentration of styrene in admixture with other material consisting essentially of ortho-xylene which comprises admixing acetic acid with said mixture and subjecting the resulting mixture to distillation conditions at subatmospheric pressure.

6. A process for the separation of styrene from other material including xylene which comprises admixing acetic acid with said mixture and subjecting the resulting mixture to distillation conditions at subatmospheric pressure and at temperatures below 100° C.

7. A process for the isolation of styrene and ortho-xylene from an admixture with other material which comprises subjecting the mixture to azeotropic distillation conditions in the presence of acetic acid and recovering ortho-xylene and styrene from their separated acetic acid azeotropes.

8. A process for the recovery of styrene and ortho-xylene from a light oil styrene fraction which comprises subjecting the fraction to distillation conditions in the presence of acetic acid and recovering separate fractions of ortho-xylene and styrene.

9. A process for the separation of styrene from ortho-xylene contained in a light oil styrene fraction having a styrene concentration of about 50 to 60% comprising distilling said fraction in the presence of acetic acid in the ratio of about 0.2 to 5.0 parts of acetic acid per part of light oil styrene fraction at subatmospheric pressures and at temperatures below 100° C., recovering styrene in a higher concentration, and separating ortho-xylene from the ortho-xylene-acetic acid mixture obtained.

10. A process for the separation of styrene from ortho-xylene contained in a light oil styrene fraction having a styrene concentration of about 50 to 60% comprising distilling said fraction in the presence of acetic acid in the ratio of about 2 parts of acetic acid per part of light oil styrene fraction at subatmospheric pressures at temperatures below 100° C., recovering styrene in a concentration of at least 80%, and treating the ortho-xylene-acetic acid mixture obtained to separate the ortho-xylene from said ortho-xylene-acetic acid mixture.

11. A process for the separation of styrene and ortho-xylene contained in a light oil styrene fraction having a styrene concentration of about 50 to 60% which comprises subjecting said fraction to azeotropic distillation in the presence of acetic acid in the ratio of about 2 parts of acetic acid per part of light oil styrene fraction at a pressure of about 100 mm. of mercury and at temperatures below 100° C., and separately recovering styrene and ortho-xylene by water washing their separated acetic acid azeotropes.

12. A process for the separation of styrene from a mixture containing styrene and xylene which comprises admixing acetic acid with said mixture, and distilling the resulting admixture.

13. A process for the separation of styrene from a mixture containing styrene and xylene which comprises admixing acetic acid with said mixture, and distilling the resulting admixture in the presence of a polymerization inhibitor and under conditions insufficiently drastic to cause the polymerization of a large part of said styrene.

14. A process for the separation of styrene from ortho-xylene contained in a light oil styrene fraction having a styrene concentration of at least about 50% comprising distilling said fraction in the presence of acetic acid in the ratio of about 0.2 to 5.0 parts of acetic acid per part of light oil styrene fraction under subatmospheric pressure conditions and under temperature conditions below 100° C.

15. A process for the separation of styrene from ortho xylene contained in a light oil styrene fraction having a styrene concentration of at least 50% which comprises adding acetic acid to said fraction in quantity sufficient to form an azeotrope between ortho xylene and acetic acid, and subjecting the resulting mixture to fractional distillation for the separation of said azeotropes.

16. A process for the separation of styrene from ortho xylene contained in a light oil styrene fraction having a styrene concentration of at least 50% which comprises adding acetic acid to said fraction in quantity sufficient to form an azeotrope between styrene and acetic acid and an azeotrope between ortho xylene and acetic acid, and separating said azeotropes by subjecting the resulting mixture to fractional distillation under subatmospheric pressure conditions sufficiently low to maintain temperature conditions during said fractional distillation below 100° C.

17. A process for the separation of styrene from ortho xylene contained in a light oil styrene fraction having a styrene concentration of at least 50% which comprises adding acetic acid to said fraction in quantity sufficient to form an azeotrope between styrene and acetic acid and an azeotrope between ortho xylene and acetic acid, separating said azeotropes by subjecting the resulting mixture to fractional distillation under subatmospheric pressure conditions sufficiently low to maintain temperature conditions during said fractional distillation below 100° C., and separating styrene and ortho xylene respectively from the respective separated azeotropes.

18. A process for the separation of styrene from ortho xylene contained in a light oil styrene fractiton having a styrene concentration of at least 70% which comprises forming an azeotrope between styrene and acetic acid and an azeotrope between ortho xylene and acetic acid by the addition of acetic acid to said fraction, and separating said azeotropes by subjecting the resulting mixture to fractional distillation under subatmospheric pressure conditions sufficiently low to maintain temperature conditions during said fractional distillation below 100° C.

19. The process of recovering a concentrated styrene fraction from a mixture thereof primarily with xylenes, which comprises subjecting such mixture to azeotropic distillation in the presence of acetic acid, removing as the overhead from such distillation a binary azeotrope of primarily xylenes and the acetic acid, and removing the concentrated styrene fraction as the bottoms stream from such distillation.

20. The process as claimed in claim 19, in which the mixture of styrene and the xylenes is obtained from the drip oil.

EDWARD H. SMOKER.

REFERENCES CITED

The following references are of record in the file of this patent:

UNITED STATES PATENTS

| Number | Name | Date |
| --- | --- | --- |
| 2,308,229 | Natta | Jan. 12, 1943 |
| 2,380,019 | Bloomer | July 10, 1945 |

OTHER REFERENCES

Nat'l Bureau of Standards Journal of Research, vol. 21, of August 1938, pages 157 to 160, and 167 to 174; article by Rose et al.

Nat'l Bureau of Standards Journal of Research, vol. 27, No. 1, July 1941, pages 39 to 63; article by Mair et al.

Nat'l Bureau of Standards Journal of Research, vol. 17 of Dec. 1936; article by White et al., pages 943 to 953.